May 30, 1967  A. M. MARKS ET AL  3,322,598
LAMINATOR FOR SECURING CONTINUOUS FLEXIBLE FILM TO A BASE
Filed Oct. 2, 1963  2 Sheets-Sheet 1

INVENTORS
ALVIN M. MARKS
MORTIMER M. MARKS
BY Albert F. Kronman
ATTORNEY

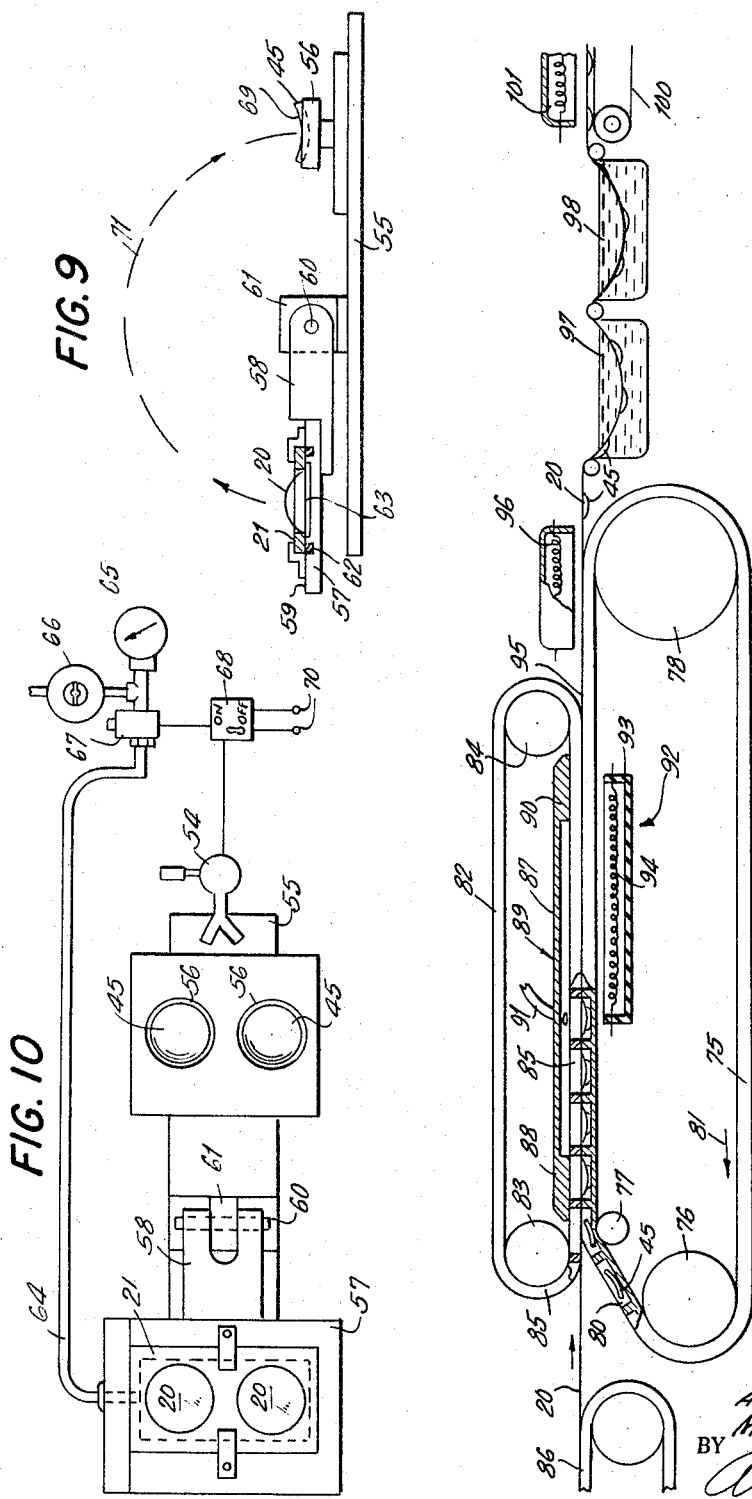

United States Patent Office 3,322,598
Patented May 30, 1967

3,322,598
LAMINATOR FOR SECURING CONTINUOUS
FLEXIBLE FILM TO A BASE
Alvin M. Marks and Mortimer M. Marks, both of
153—16 10th Ave., Whitestone, N.Y. 11357
Filed Oct. 2, 1963, Ser. No. 313,299
6 Claims. (Cl. 156—382)

This invention relates to a laminator for securing thin flexible films to a base having a curved surface, and is a continuation-in-part of an application entitled "Film Casting Composition and Method," Ser. No. 780,580, filed Dec. 15, 1958, now abandoned. While the invention has many uses, it is particularly adapted to securing light polarizing film to the curved surface of a lens. The invention also relates to the use of flexible films which may be softened to some degree by the application of heat or a softening solution.

Prior known methods of laminating film to glass surfaces have included the use of mechanical pressure devices. Generally these devices employ a resilient pressure surface, such as rubber, to make contact with the film during the cementing process. When the film is very thin, the rubber surface has a tendency to mar the surface of the film, distort the surface, and alter the polarizing characteristics. The present invention eliminates these difficulties and provides a laminated structure which retains all of the characteristics of the original film. This is accomplished by the application of fluid pressure, the details of which will be set forth later.

Accordingly, it is an object of the present invention to provide an apparatus for applying thin flexible films to curved surfaces by the use of fluid pressure.

Another object of the invention is to produce a laminated article comprising a curved supporting base and a thin film permanently cemented to one side.

Another object of this invention is to provide adjacent laminated layers having a chemically bonded joint at the lamination interface, without the use of an intermediate layer of cement.

Another object of the invention is to provide the apparatus for automatically applying a thin film to a base having a concave spherical surface.

Another object of the invention is to eliminate air bubbles at the curved lamination interface.

Another object of this invention is to employ small differential pressures, or vacuum to delicately produce lamination contact until a suitable adhesive occurs at the lamination interface.

The invention consists of the construction, combination, and arrangement of parts, as herein illustrated, described and claimed.

In the accompanying drawings, forming a part hereof, there are illustrated three forms of embodiment of the present invention, in which drawings similar reference characters designate corresponding parts, and in which:

FIGURE 9 is a view inside elevation of another form of apparatus for applying a thin flexible film to a base member having a curved surface.

FIGURE 10 is a plan view of the complete apparatus shown in FIGURE 9.

FIGURE 11 is a side view, partly in section, which shows another means for applying a thin flexible film to a plurality of bases having curved surfaces.

Figure 1:
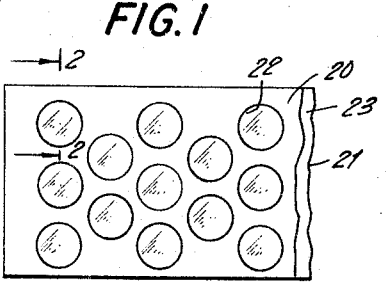
FIGURE 1 is a plan view of a continuous flexible thin film on a cardboard supporting strip.

FIGURE 12 is a cross-sectional view somewhat enlarged showing a film secured to a support prior to the formation of a "bubble," by distention Referring now to FIGURES 1, 2, 3, 4 and 5, there is shown a flexible film 20 secured to a supporting strip of plastic, cardboard or the like 21. The flexible film 20 may be manufactured continuously from solution by means of the apparatus and process disclosed in U.S. Patent No. 2,897,544, issued August 4, 1959; or, by any film forming device capable of producing thin cast film, particularly light polarizing film, of suitable quality. The above mentioned patent discloses the manner in which a polarizing film may be made and delivered directly to an assembly means such as that shown in FIGURE 3, wherein the film 20 is applied to a support, such as a strip of cardboard 24 which is directed over two rolls 25 and 26. The cardboard 24 has an adhesive 23 to which the film adheres. The cardboard 24 may be supported by an endless belt 27 driven by a motor 28. A series of guide rollers 30 are arranged to prevent the cardboard from leaving the belt 27. While this continuously operating means is preferred, flat sheets of the film may be placed on top of cardboard sheets of the same size and the two adhered by pressing together in a flat press. Other obvious means for preparing the assembly shown in FIGURE 1 may be used.

Figure 2:
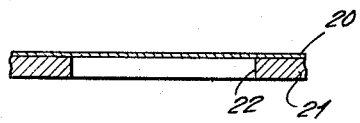
FIGURE 2 is a cross-sectional view on an enlarged scale of a portion of the strip shown in FIGURE 1 and is taken along line 2—2 of that figure.

The cardboard supporting sheet 21 is provided with a plurality of spaced holes 22 as shown in FIGURES 1 and 2. The film 20 is attached to the cardboard, and is unsupported across the holes 22.

Figure 4:
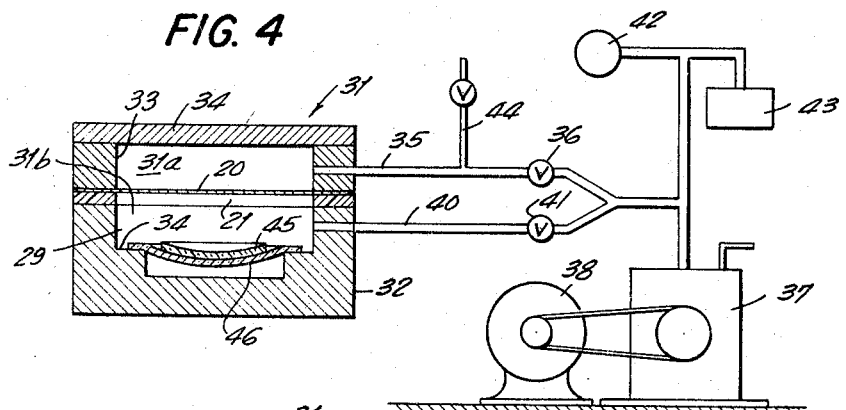
FIGURE 4 is a diagrammatic side view somewhat enlarged and partly in section showing one method of applying the film to the spherical surface of a base member, such as, a transparent optical lens.
Figure 6:
FIGURE 6 is a sectional view of one form of the finished product which consists of a glass lens having a thin film secured to its upper surface.
Figure 5:
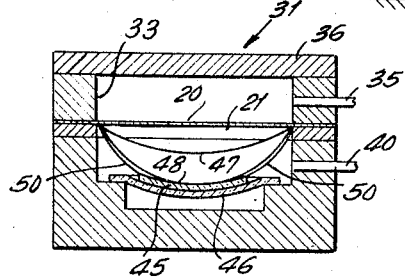
FIGURE 5 is a sectional view of a portion of the apparatus shown in FIGURE 4 and illustrates the consecutive steps in the process of applying and laminating the film to the base.
Figure 7:
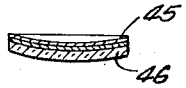
FIGURE 7 is a sectional view of another form of the finished product, similar to that shown in FIGURE 6 but including an additional coating containing a color filter.
Figure 8:
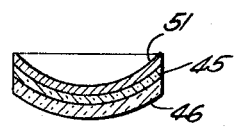
FIGURE 8 is a sectional view similar to FIGURE 7 but showing a laminated structure consisting of a glass lens, a thin film and an added hard surface coating.
Figure 3:
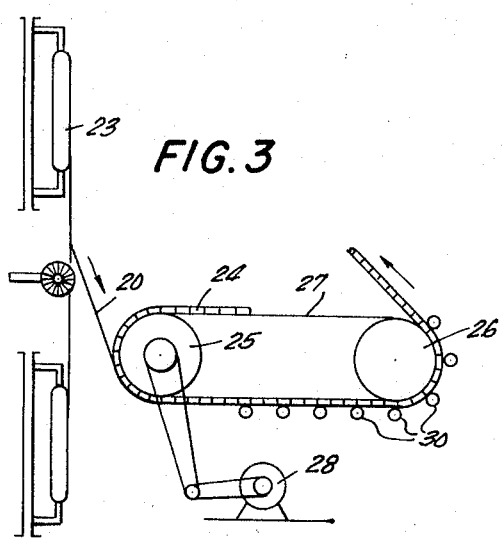
FIGURE 3 is a partly diagrammatic side view, which shows one means of applying the thin flexible film to the cardboard base.

The cardboard support and its film are clamped within a pressure chamber indicated at 31 in FIGURES 4 and 5 thus forming an upper chamber 31a and a lower chamber 31b. The pressure chamber 31 is made up of a lower portion 32 having a cavity 29 therein, a ring-like upper portion 33 and a cover 34 which seals the chamber from outside pressure. As can be seen from the figures, the film 20 and its supporting cardboard 21 are clamped between the lower and upper wall portions 32, 33 of the pressure chamber 31. The upper portion 31a of this chamber is connected to a conduit 35 which is connected through a valve 36 to a pump 37 run by an electric motor 38. Various other types of pressure or vacuum pumping arrangements may also be used. The one shown in FIGURE 4 is only one means of producing a pressure differential between the volume above film 20 and the volume below the film. The lower portion 31b of the pressure chamber 31 is connected to a conduit 40 and the same pumping system in series with a valve 41. The pump may be supplied with the usual gauge 42 and a reservoir 43.

In the practice of the present invention a pressure differential is provided between the two portions of the pressure chamber 31a, 31b. One method of creating this difference in pressure is to connect conduit 35 to an adjustable leak 44. After the motor 38 is started and the vacuum pump 37 has drawn air from both chambers, valves 36 and 41 are then closed. Both chambers 31a and 31b are evacuated, for example to 1 mm. Hg pressure. Subsequently, the pressure in the upper chamber 31a above the film 20 may gradually rise to one atmosphere as air leaks through adjustable leak 44 and causes the pressure in the upper portion of the vacuum chamber 31a to rise to a higher pressure than the pressure in the lower portion 31b.

FIGURE 5 illustrates the method of laminating a film 20 to a base. The base portion, which may be a glass lens 45, is placed within the pressure chamber cavity 29 on a support 46. After the vacuum has been established in both upper and lower chambers 31a and 31b, the valves 36 and 37 are closed, and the leak 44 is started. The film then starts to distend or bulge downward. The film first is bulged to a position illustrated by curve 47. Next, it assumes the position shown by curve 48. It should be noted that in this position the central portion of the distended film 20 is in contact with the center of the lens 45 while the edge portions are not in contact. At the point of contact the radius of curvature of the film is less than that of the surface of the base, which is usually the concave surface of the lens. For some types of laminar objects no adhesive is required, the adhesion of the film to the glass requiring only a subsequent heat treatment or the use of a softening agent. For laminations which are to be performed in a partial vacuum, or at atmospheric pressure, air must be excluded to accomplish this. To exclude all air, a small quantity of liquid is placed on the glass base 45, which collects at the lowest portion of the supporting base. When the film 20 is distended to coincide with curve 48, the liquid is squeezed out and forced to the periphery of the film. The slight excess of liquid remaining between the lens surface and the film is absorbed by the film, and subsequently evaporated while the film is hardened by heating. The liquids employed may contain reactive adhesive agents, for example a soluble silica such as silicic acid, which may be derived from hydrolysis of a tetra-alkyl orthosilicate or other adhesives well known to the art.

As the pressure differential increases and the film assumes the position shown by curve 50, the excess fluid is forced out over the edge of the glass lens and the film contacts the entire base. Substantially all the air bubbles are thus eliminated from between the film and the base. The result is a clear transparent bond between the glass lens base 45 and the film 20.

When the lamination is made without liquid initially using a partial vacuum of the order of 1 to 10 mm. Hg, any small bubble remaining at the interface during the lamination operation, is compressed by the application of atmospheric pressure to the finished film, to an extremely small size which is invisible.

The film may be adhered to the base surface without the use of an adhesive, as follows: The film is softened by the application of a solution which is absorbed into the film so that it may be readily deformed by differential fluid pressure so as to conform to the surface of the base.

If the film is made of polyvinyl butylral iodide, it may be softened by one of the laminating fluids such as are hereinafter set forth in Examples I, II, III or IV.

In Examples I and II below, a reactive ingredient such as terta-alkyl orthosilicate is included in the film softening fluid. The reactive ingredient is capable of reacting with the film and the glass surface to produce highly satisfactory chemical bond at the interface. The excess fluid is absorbed into the film, where a proportion remains to crosslink the film, the excess evaporating from the surface of the film.

In Example III no reactive component is utilized and the adhesion resulting is relatively weak. However, such adhesion can be augmented by subsequent penetration through the film to the interface of a reactive component from the outer side of the film, as hereinafter shown.

In Example IV, any suitable conventional cement known to the art is employed.

After the assembly operation, following the use of the lamination liquid of Example II, the film and its base are heated in an oven for a short time at a temperature which is within the range of 50 to 70 degrees centigrade. Other heating cycles may be employed. Alternatively, certain cements known to the art which harden at room temperature, may be employed.

| | Parts |
|---|---|
| Tetra-alkyl orthosilicate | 60–80 |
| Ethyl alcohol or ethyl acetate | 40–20 |

*Example II—(Specific)*

| | Parts |
|---|---|
| Tetra-ethyl orthosilicate | 65 |
| Ethanol | 35 |

*Example III*

| | Parts |
|---|---|
| Water | 90 |
| n-Propanol | 10 |

If a laminating liquid is used to exclude air, it is not necessary to use a vacuum chamber during the laminating process.

FIGURES 9, 10 and 12 show one form of apparatus which permits the sealing of films to curved bases in the atmosphere. This arrangement includes a table 55 which supports one or more platforms 56 made to accommodate glass bases or lenses 45. The platform is rigidly secured to the table 55 so that it cannot be moved. A heating device 54 may be incorporated in this portion of the structure so that after the lamination operation, the assemblies may be subjected to a heating cycle.

The film supports 21 and the attached films 20 are clamped to the top 59 of a plate 57 which in turn is secured to a pivoted arm 58. The arm 58 is rotatable about a pin 60. The pivoted structure is secured to table 55 by means of a bearing plate 61. The top portion 59 of plate 57 is provided with resilient means, such as an O ring 62 which seals the volume under the film 20 from the outside atmosphere to form a chamber 63 beneath the film. The chamber 63 is connected by means of a flexible conduit 64, best shown in (FIGURE 10) to a pressurized system which includes a pressure indicator 65, a manually operated valve 66, and a solenoid valve 67 operated by a switch 68 which is connected to terminals 70 and to a source of electric power (not shown). The operation of this device includes the application of fluid (air) pressure through valve 67 and conduit 64 to chamber 63 under the film 20. This pressure causes the film 20 to be distended to the shape shown in FIGURE 9. The plate 57 is then swung through an arc designated by the dashed lines 71 in FIGURE 9, and the film is applied to the top concave portion 69 of the glass base 45 which may contain a small quantity of liquid, set forth in Examples I, II, III or IV herewith. As soon as the liquid has been distributed between the interface of the glass base 45 and the film 20, and the excess has been forced out of the edges of the laminate in the manner hereinabove set forth, the laminated article may be heated, for example by the hot air blower 54, to set, causing a temporary or permanent bond to occur and permit the laminated article to be removed from the device. The excess material may now be removed from the edge of the glass base and the laminated article is finished.

The machine shown in FIGURE II illustrates a device for the continuous production of laminated articles. This device comprises a first belt 75 which moves on rollers 76, 77 and 78. The belt contains a plurality of small cavities 80 for holding the glass bases 45. These bases may be deposited in the cavities by hand as the belt 75 moves around the rollers in the direction indicated by arrow 81.

A second belt 82 moves on two rollers 83 and 84 and contains openings 85 which register with the cavities 80 in the first belt. The two belts are synchronized so that the openings 85 are always directly above the cavities 80. The film 20 is fed into the machine as shown at the left in FIGURE 11. Since the films used in this process may be cast directly from solution, and stretched while still soft, the belt 75 on the laminating portion of the machine, may be employed to stretch and deliver the film into the machine.

The casting belt 75 may, for example, travel at five times the velocity of the casting belt 86, thus providing in this case a stretch ratio of five times immediately before the lamination process. This has the advantage of laminating the film just after the stretching operation while it is still soft enough to deform during the lamination process; no further softening being required in such case.

A pressurized chamber 89 is maintained above the lower portion of belt 82. This chamber is enclosed by a flat trough-like cover 87 and pressure seals 88 and 90 at each end. These shields are arranged for wiping contact with the belt 82, and are surfaced with a thin resilient material to retain pressure within the chamber. The pressurized chamber is in communication with the openings 85 in the belt 82. The pressure seals need not be entirely tight because the pressure within the chamber 89 is never more than about two pounds per square inch above the ambient or atmospheric pressure. The pressure in the chamber 89 is maintained by a conduit 91 which is connected to a pump or a pressure reservoir (not shown). The pressure is thereby maintained in spite of leaks which may occur at the ends of the chamber 89.

As the film 20 on the lower belt 75 is subjected to the pressure in the chamber under sheet 87, portions of the film 20 become distended into the cavities 80 and make contact with the glass bases. The process of adhering the film and the glass bases is the same as described above in connection with the other types of laminating structures. Since heat is a necessary part of the operating cycle, an electrical heating means 92 is provided, for example as shown under the belts, before the film and its glass bases leave the area beneath the pressurized chamber. This heating means comprises a pan 93 of insulating material which carries one or more heating elements 94. The heating elements are connected to an external source of electric power and remain active as long as the belts are in motion.

After the lower belt 75 leaves the upper belt as indicated at 95, the cavities 80 are open to the atmosphere and the solvent vapors which may exist in the cavities can escape. In order to dry the laminated articles completely, an additional hot air chamber 96 may be positioned above the first belt 75 just before the film 20 with its adhered glass base 45 is pulled from the belt. The film strip 20 with glass bases 45 adhering thereto is now passed through a first silica bath 97 and then through a wash bath 98 as described in U.S. Patent No. 2,432,113. The strip then continues to another belt 100 and into a final heating chamber 101 where the laminated assemblies are heated to 90 degrees centigrade for about one-half an hour. On emerging from this oven the film web is brittle, the lenses can be separated and the excess material removed from the edges of the base. The operation is now complete.

The machine illustrated in FIGURE 11 may be modified in certain respects, without departing from the scope of this invention. For example, one important modification is the eliminaton of the belt 82 and cover 87, by utlizing a negative pressure differential instead of a positive pressure differential. This requires a partial vacuum of approximately 2 p.s.i. applied to the chamber between the lens and the film.

In all other respects the invention is the same.

In any case, differential pressure is utilized to establish a tangential point of contact between the film and the lens surface by producing a smaller radius of curvature of the film than the radius curvature of the concave lens surface. Thereafter the pressure differential is increased to bring the film and concave surface together to drive out the intervening fluid or liquid and complete the lamination.

Where only partial vacuum or pressures in the vicinity of atmospheric are employed, a laminating fluid is required to eliminate air at the interface. Where a substantially complete vacuum is initially obtained, as was described in connecton wth FIGURES 4 and 5, no laminating fluid need be present on the concave surface of the lens.

In all cases, the film must be sufficiently soft so that it may be distended to perform the herein described lamination operations.

In FIGURE 11 dips shown at 97 and 98 are required to cross-link the film and produce an intrinsic bond at the interface between the film and the glass as well as to subsequently wash the excess reactive fluid from the surface of the lens.

In still another modification of this invention, the steps 97 and 98 in FIGURE 11 are eliminated. The steps eliminated are those involving liquid dips subsequent to the lamination process. The modification proposed comprises the use of reactive cross-linking materials incorporated directly into the film within the casting solution so that when the film is stretch crystallized to form a polarizing film, it is still soft enough to be distended and adhered to the surface of the lens. In this case an intrinsic bond is formed immediately by virtue of the reactivity of the cross-linking agent still present and as yet non-reacted within the film at the point of contact with the glass surface.

Subsequent completion of the bonding to form a chemical bond and to harden and stabilize the film may be performed in the heating operation shown by the oven generally indicated at 101 in FIGURE 11.

Having thus fully described the invention, what is claimed as new and desired to be secured by Letters Patent of the United States, is:

1. A laminator for securing a flexible film to a base having a concave surface, comprising a hollow support for holding the base comprising an upper hollow portion and a lower hollow portion, film holding means for securing and supporting the film at a position beyond the area to be applied to the base, means to clamp the film and its holding means in fluid tight contact between the upper and lower portion of the base support and means to apply a pressure differential across the unsupported surfaces of the film whereby the film is first distended into tangential contact with the concave surface of the base and thereafter further distended to complete the lamination, said pressure applying means comprising a source of vacuum attached to the upper and lower portion of the base support and means for introducing a fluid under pressure into the volume above the film.

2. A device according to claim 1 in which the film support means consists of a sheet of cardboard having an opening therein disposed beneath the film.

3. A laminator for securing continuous flexible film to a plurality of base members having a concave surface comprising, a continuous first belt-like support for the bases, a continuous second belt-like support for the film, means to drive the first and second belts to deliver the film to a position overlying the bases, a third continuous belt-like member overlying the first belt to urge the film into contact with the said bases, said third belt having openings therein in communication with the top surface of the film and means connected to the third belt openings to direct fluid under pressure against the upper surface of the film, to spherically distend the film into contact with the concave surfaces of the bases therebeneath.

4. A laminator for securing continuous flexible film to a plurality of base members having a concave surface comprising, a continuous first belt-like support for the bases, a continuous second belt-like support for the film, means to drive the first and second belts to deliver the film to a position overlying the bases, a third continuous belt-like member overlying the first belt to urge the film into contact with the said bases, said third belt having openings therein in communication with the top surface of the film and means connected to the third belt openings to direct fluid under pressure against the upper surface of the film, to spherically distend the film into contact with the concave surfaces of the bases therebeneath and heat supplying means adjacent the first and third belts to direct heat at the film and base laminations.

5. A laminator for securing a continuous flexible film to a plurality of base members having a concave surface comprising in combination, film casting means consisting of a continuous casting belt, a continuous first belt-like support for the bases to receive the film from the casting belt, means to drive the first belt at a speed greater than the speed of the casting belt whereby a linear stretch is imparted to the film, a continuous second belt-like support for the film, means to drive the first and second belts to deliver the film to a position overlying the bases, a third continuous belt-like member overlying the first belt to urge the film into contact with the said first belt, said third belt having openings therein in communication with the top surface of the film and means connected to the third belt openings to direct fluid under pressure against the upper surface of the film to spherically distend the film into contact with the concave surfaces of the bases therebeneath.

6. A laminator for securing a flexible film to a base having a concave surface, comprising a hollow chamber for holding the base comprising an upper hollow portion and a lower hollow portion, a support in said lower hollow portion holding said base with said concave surface facing upwardly, film holding means for securing and supporting the film at a position beyond the area to be applied to the base, means to clamp the film and its holding means in fluid tight contact between the upper and lower portion of the base support and means comprising a first source of vacuum in communication with the interior of the upper hollow portion, a second source of vacuum in communication with the interior of the lower hollow portion and means to lead a gas under pressure into the upper hollow portion to apply a pressure differential across the unsupported surfaces of the film whereby the film is first distended into tangential contact with the concave surface of the base and thereafter further distended to complete the lamination.

References Cited
UNITED STATES PATENTS

| | | | |
|---|---|---|---|
| 1,737,874 | 12/1929 | Busch | 264—92 |
| 2,978,376 | 4/1961 | Hulse | 264—92 |
| 3,026,232 | 3/1962 | Finch | 156—212 |

EARL M. BERGERT, *Primary Examiner.*

HAROLD ANSHER, *Examiner.*